United States Patent [19]
Suzuki et al.

[11] 3,819,446
[45] June 25, 1974

[54] METHOD FOR MANUFACTURING ELECTRICAL APPARATUS

[75] Inventors: Takashi Suzuki, Toyonaka; Koichi Hirakawa, Kawanishi, both of Japan

[73] Assignee: Matsushita Electric Industrial Co., Ltd., Osaka, Japan

[22] Filed: Dec. 28, 1970

[21] Appl. No.: 102,188

Related U.S. Application Data

[62] Division of Ser. No. 855,087, Sept. 4, 1969, abandoned.

[52] U.S. Cl. ................... 156/291, 117/38, 117/43
[51] Int. Cl. .......................... B32b 7/14, B44d 1/52
[58] Field of Search ............ 156/291; 117/43, 38; 101/150

[56] References Cited
UNITED STATES PATENTS

| | | | |
|---|---|---|---|
| 1,529,973 | 3/1925 | Underhill | 336/207 X |
| 2,962,409 | 11/1960 | Ludlow et al. | 156/291 |
| 3,246,271 | 4/1966 | Ford | 156/291 |

FOREIGN PATENTS OR APPLICATIONS

| | | | |
|---|---|---|---|
| 521,874 | 6/1940 | Great Britain | 156/291 |

*Primary Examiner*—Leon D. Rosdol
*Assistant Examiner*—M. F. Esposito
*Attorney, Agent, or Firm*—Stevens, Davis, Miller & Mosher

[57] ABSTRACT

A method for manufacturing an electrical apparatus in which plate electric conductors on one or both surfaces of each of which an electrically insulating synthetic resin compound is localized in the form of dots, lines or mesh are superposed so that the insulation distance between said conductors is maintained by said localized synthetic resin, and a thixotropic thermosetting resin solution is used as the insulating synthetic resin compound for being localized on the surfaces of said plate conductors by the intaglio printing or the silk-screen printing.

1 Claim, 3 Drawing Figures

PATENTED JUN 25 1974 3,819,446

METHOD FOR MANUFACTURING ELECTRICAL APPARATUS

CROSS-REFERENCE TO RELATED APPLICATION

This application is a division of U.S. Pat. application Ser. No. 855,087 filed on Sept. 4, 1969, now abandoned.

BACKGROUND OF THE INVENTION

1. Field of the Invention

The present invention relates to a method for manufacturing an electrical apparatus formed by superposing plate conductors on the surface of which an electrically insulating synthetic resin compound is localized.

2. Description of the Prior Art

In electrical apparatus such as capacitors and electromagnetic coils, etc., plate conductors, e.g., aluminum or copper foils are superposed with an electrical insulator inserted as a spacer. In most cases, the long plate conductors without being subjected to the insulation treatment are superposed and rolled together with paper and plastic films, etc., or they are coated in advance with an insulating varnish film or metal oxide and are then rolled. The insulating layer or the dielectric layer is in the form of continous sheet which is made of a material having good flexibility. Materials, e.g., epoxy resin with fillers having poor flexibility are difficult to roll and are therefore not suitable for this purpose.

When such materials must be used, a flat structure should be adopted, as seen in the capacitor where glass and ceramics are used as the dielectric. For electrical apparatus of a rolled-up type a large scale arrangement or complex manufacturing steps are necessary. By a rolled-up type electrical apparatus is meant an electromagnetic coil or capacitor which is formed by rolling up a long-sized metallic conductor together with an electrically insulating layer interposed therebetween. In such an apparatus, a very minute gap usually exists between the plate conductor and the insulating layer or between the insulating layers. In order to impregnate a liquid insulator into the gap, considerable time and advanced technique are required,. The present invention is particularly suited to such electrical apparatus of the rolled type (but not restricted thereto alone), the characteristics thereof being that the use of materials having poor flexibility, e.g., epoxy resin with fillers is allowed, that the manufacturing steps are simple, and that the liquid insulator is easily impregnated.

SUMMARY OF THE INVENTION

The object of the present invention is to provide a method for manufacturing an electrical apparatus, comprising plate conductors one or both surfaces of which are coated locally with an electrically insulating synthetic resin compound in the form of dots, lines, or mesh so that when the plates are superposed an insulating distance is always maintained by the height of the compound.

DESCRIPTION OF THE PREFERRED EMBODIMENT

In these figures, 1 and 1' are plate conductors, 2 and 2' are synthetic resin compounds localized on the plate conductors 1 and 1'.

Figure 1:
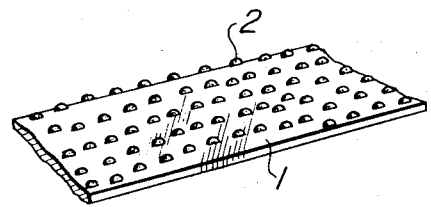
FIGS. 1 and 2 show a part of the long plate conductor whose surface is coated locally with an electrically insulating synthetic resin compound.
Figure 2:
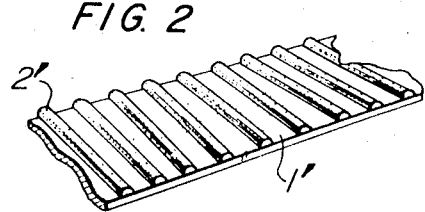
Figure 3:
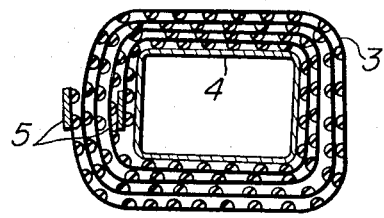
FIG. 3 shows a cross-sectional view of an electromagnetic coil formed by rolling plate conductors whose surface is coated locally with a synthetic resin compound.

In FIG. 3, 3 is the plate conductor having a synthetic resin compound localized on the surface, 4 is a coil bobbin and 5 shows leads.

The plate conductor is made of aluminum or copper foil and strip. It is desirable that the end of the side surface be preliminarily rounded by polishing or chemical etching. Another possible manufacturing step is to localize a synthetic resin compound on a long plate conductor, cut it into a prescribed width, and eliminate the corner. A fin or flash, etc., on the corner of the plate presents the danger of causing an insulation failure, and hence should be removed.

The gist of the present invention is to localize the synthetic resin compound on the plate conductor. The localization here means that many small protrusions or ridges of synthetic resin compound having a prescribed height exist on the surface of the conductor strip so that in the final form of the electrical apparatus the gap between the conductors may be constantly maintained. In the portion between the protrusions or the ridges the synthetic resin compound need not exist, although the existence of compound there does not change the meaning of localization so long as the height of such a compound is sufficiently smaller than that of the protrusions or the ridges. The localization according to the present invention corresponds to a bad state of conventional coating where a large number of pinholes are seen in the resin insulating film on the surface of the plane conductor. Usually, the coating is desired to have no or substantially no pinhole. However, the inventors have found experimentally that even with an extremely bad coating having many pinholes the film may be used satisfactorily so long as the gap between each turn is constant. In the conventional methods, in order to avoid pinholes the insulating paper used as a spacer is superposed two or three-fold.

As described above, the synthetic resin compound plays a role of maintaining the gap between the plane conductors constant. During the operation of the apparatus, the synthetic resin compound serves, as it were like aggregate, to maintain the gap between adjacent conductors against the tendency to decrease the gap due to the steep rise of temperature within the apparatus and the electromagnetic force acting on the conductors. The synthetic resin compound, being localized on the plate conductor to a prescribed dimension, is preferably a thermoplastic resin with an inorganic filler such as vinyl chloride powder for powder coating and polyamide resin filled with glass powder, and a semi-hardened thermo-setting resin powder such as epoxy resin powder for powder coating, and a thermo-setting resin solution without solvent having high thixotropy such as a material for epoxy molding. Other usual synthetic resins such as polypropylene, Teflon, polyamide, phenol, alkyd, polyester and silicon may be used with the addition of a suitable filler and with use of a suitable localization method.

Appropriate methods of localizing these compounds, if they are solid powder, on the plate conductor are fluid dipping, electrostatic attachment and spray coating. In these cases it is necessary to control temperature, voltage, pressures, etc., so that the powder may be localized to a prescribed height on the plate conductor. The thixotropic resin liquid can be localized by intaglio printing such as photogravure, which is most effective in obtaining uniform localization. After printing it is important to harden the resin without collapsing its shape.

Another method is to spray a thermo-setting liquid resin from a nozzle in the form of minute particles, attach them scatteredly on the surface of the conductor, and harden them.

The optimum dimension of the resin compound localized in the form of dots, lines, or mesh depends on the size of the conductor and electrical apparatus, and on the kind of compounds. In the case of an electromagnetic coil the suitable width and height are 5 to 100 $\mu$. The height is desired to be made uniform as much as possible as it is directly related to the insulation strength between the turns. The distance between each localized compound, i.e., between each protrusion or ridge, is preferably 5 to 50 $\mu$.

The synthetic resin compound may be localized either on one side or on both sides of the plate conductor. The surface of the plate conductor is preliminarily treated by a conventional method such as pickling, etching, chemical oxidation, and anodic oxidation, etc., for good adhesion with the synthetic resin compound.

The electrical apparatus finished as shown in FIG. 3 is liable to be influenced by moisture if used in the rolled state. So, when it is used in air, it should be subjected to varnish treatment or resin molding. Under insulating oil or in an insulating gas such as $SF_6$, use in the rolled state is possible. In this case effective cooling is done by the oil or the gas which moves into the gap between the conductors and removes the heat. If there is a fear of sliding between the conductors due to a mechanical force, it is possible with a suitable selection of resin to slightly fuse the surface of the localized resin and fix the conductors.

When the electrical apparatus is used in air, a resin mold is desirable. This can be done by injecting resin as shown in FIG. 3, or by applying a liquid resin to the gap of the localized resin while rolling, or by rolling the foil in the liquid resin. The liquid resin used here is epoxy and polyester having a thermo-setting property. The hardening of the resin is done below the temperature at which the localized resin compound softens or fuses.

Next, some embodiments of the present invention will be described.

EXAMPLE 1

On one surface of an aluminum foil having a thickness of 0.05 mm and a width of 20 mm with the edge rounded by etching thixotropic epoxy resin (trade name: Scotch Cast No. 253 manufactured by MMM Co., Ltd. U.S.A.) was localized by gravure printing and hardened by heat. The resin was distributed in the form of particles having a diameter of about 40 $\mu$ and a height of about 30 $\mu$. The foil was cut about 5 m long. Two of them were superposed and rolled around a bobbin having a diameter of 30 mm to form a capacitor.

The measured breakdown voltage between the electrodes was 95 V (A.C. 60 Hz). No abnormality was found under the application of 20 volts A.C. for 1,000 hours in 60°C oil. The capacitance was 1.2 $\mu$F and the loss was 0.3 percent at 1 KHz.

EXAMPLE 2

A capacitor formed in the same way as in Example 1 was molded by an epoxy agent having the following composition.

| Epicot | 828 | 100 | phr |
|---|---|---|---|
| HPA | | 80 | phr |
| DMP-30 | | 0.5 | phr |

Hardening was carried out at 100°C for 24 hours and then at 140°C for 24 hours. The breakdown voltage was 120 V (A.C. 60 Hz). No abnormality was found under an application of 20 volts for 1,000 hours at 40°C in air.

EXAMPLE 3

An aluminium foil on which resin was localized in the same way as in Example 1 was coated with an epoxy resin solution (Scotch Cast No. 235, manufactured by MMM Co., Ltd.) by a roll-coat while being rolled. After the resin was hardened by heat, an induction insulation test was carried out. No abnormality was found under the continuous application of turn voltage 30 V (A.C. 60 Hz) for 10 minutes. The length of aluminium foil was 5 m.

EXAMPLE 4

An aluminium strip having a thickness of 0.2 mm and a width of 100 mm with the end rolled was treated in an aqueous solution of 5 percent sodium chromate and 15 percent sodium carbonate for 2 minutes, then rinsed and dried. Thereafter the strip was dipped in the promotor for epoxy resin, i.e., 10 percent ethanol solution of DMP-30, removed and dried. Next the epoxy resin mixture having the following composition was localized on both surfaces of the aluminium foil in the form of minute liquid drops by using a spray gun.

| The composition of epoxy resin | Epicot 828 | 100 phr |
|---|---|---|
| | MNA | 80 phr |
| | MgO | 20 phr |

Hardening was carried out at 250°C for one hour. The resin particles had a diameter of 40 to 100 $\mu$ and a height of 20 to 30 $\mu$. The distance between particles was 50 to 200 $\mu$. The foil thus formed was cut 10 m long and rolled around bobbin having an outer diameter of 50 mm to form a coil. The induction insulation test was carried out in insulating oil. No abnormality was found under the application of turn voltage 30 V (A.C. 60 Hz) for 10 minutes.

EXAMPLE 5

An aluminium foil having a thickness of 0.05 mm and a width of 20 mm with its end rounded was dipped in a fluid layer of epoxy resin powder (Scotch Cast No. 265, manufactured by MMM Co., Ltd.) at room temperature, then pulled up and printed at 200°C for 5 minutes. Epoxy powder with a small grain diameter was attached on the aluminium foil in the localized state. The height of resin was 5 to 20 $\mu$. The foil thus formed was cut 5 m long. Two of them were superposed and rolled around a bobbin having an outer diameter of 30 mm to form a condenser. The breakdown voltage measured in air was 45 V (A.C. 60 Hz).

The characteristic of the present invention is in a method for manufacturing an electrical apparatus in which the synthetic resin compound is localized on a band-like conductor. Therefore, the present method is far more efficient in comparison with the conventional methods where a spacer is employed, or rolling is done after completing the insulation. Furthermore, the synthetic resin compound in the present invention need not have such a great flexibility as has been required for the insulating varnish used for the formation of a film. Thus, resins having a good heat-proof property can be used. It is possible for the same reason to mix a large amount of inorganic fillers having no flexibility into the synthetic resin compound. Compounds having an excellent heat radiation property and good resistance against heat-softening can be employed. By mixing a ferroelectric material such as barium titanate a miniaturized capacitor of high capacity becomes possible. The lead-out of the wires during fabrication of the electrical apparatus can be done more easily compared to the case with the conductors entirely covered with an insulating film. Good impregnation can be obtained by selecting a suitable localization so that an electrical apparatus free from voids between conductors can be easily fabricated. Therefore, the present invention has many advantages and much industrial merit.

We claim:
1. A method for manufacturing a rolled-up type electrical apparatus comprising the steps of:
    applying a thixotropic thermo-setting synthetic resin compound to at least one surface of a long-sized metallic conductor, said resin compound being localizedly distributed over all of said surface by intaglio or silk-screen printing,
    curing the thus applied resin compound, and
    then rolling up the resulting metallic conductor to form said rolled-up type electrical apparatus.

* * * * *

UNITED STATES PATENT OFFICE
CERTIFICATE OF CORRECTION

Patent No. 3,819,446                    Dated June 25, 1974

Inventor(s) TAKASHI SUZUKI et al

It is certified that error appears in the above-identified patent and that said Letters Patent are hereby corrected as shown below:

Please insert the following reference to the Japanese Patent Applications deleted from the Original Letters Patent:

At Block 30 please insert --- Foreign Applications

Priority Data

September 10, 1968   Japan.................. 65719/68
September 10, 1968   Japan.................. 65720/68 ---.

Signed and sealed this 14th day of January 1975.

(SEAL)
Attest:

McCOY M. GIBSON JR.                 C. MARSHALL DANN
Attesting Officer                   Commissioner of Patents